United States Patent
Kitajima et al.

(10) Patent No.: US 12,103,454 B2
(45) Date of Patent: Oct. 1, 2024

(54) VEHICLE TRANSPORTING DEVICE

(71) Applicant: TOYOTA JIDOSHA KABUSHIKI KAISHA, Toyota (JP)

(72) Inventors: Toshiki Kitajima, Mishima (JP); Norinao Watanabe, Susono (JP); Yutaka Nakamura, Susono (JP); Naoya Kajita, Toyota (JP); Kenji Nakano, Toyota (JP); Takafumi Sannomiya, Okazaki (JP); Yasutada Shimizu, Okazaki (JP); Kohei Yasuda, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 333 days.

(21) Appl. No.: 17/713,605

(22) Filed: Apr. 5, 2022

(65) Prior Publication Data

US 2022/0410789 A1 Dec. 29, 2022

(30) Foreign Application Priority Data

Jun. 23, 2021 (JP) .................................. 2021-104308

(51) Int. Cl.
*B60P 3/073* (2006.01)
*B60P 1/02* (2006.01)

(52) U.S. Cl.
CPC ................. *B60P 3/073* (2013.01); *B60P 1/02* (2013.01)

(58) Field of Classification Search
CPC .... B60P 3/073; B60P 1/02; B60P 3/07; B60P 3/075; B60P 3/06; B66F 7/0625;
(Continued)

(56) References Cited

U.S. PATENT DOCUMENTS

| 10,590,669 B2 * | 3/2020 | Boussard ................ E04H 6/182 |
| 11,312,415 B2 * | 4/2022 | Tzivanopoulos ....... B60S 13/00 |

(Continued)

FOREIGN PATENT DOCUMENTS

| CN | 104358454 A | * | 2/2015 |  |
| CN | 108868265 A | * | 11/2018 | ............. E04H 6/305 |

(Continued)

OTHER PUBLICATIONS

Translated JP-2019078099-A (Year: 2024).*
Translated WO-2021117086-A1 (Year: 2024).*

*Primary Examiner* — James A Shriver, II
*Assistant Examiner* — Ian Bryce Shelton
(74) *Attorney, Agent, or Firm* — Dinsmore & Shohl LLP

(57) ABSTRACT

A vehicle transporting device includes a bogie frame, a device main body, and an upright frame. The upright frame connects a tip portion of the bogie frame and the device main body. The bogie frame includes two frame members and at least two pipes, which are disposed parallel to a longitudinal direction of the bogie frame. The two frame members are disposed parallel to the at least two pipes at a position outside the at least two pipes in a width direction of the bogie frame. The at least two pipes include two pipes facing each other in the width direction. A reinforcing member extending in the width direction is provided at the tip portion of the bogie frame and between the two facing pipes. The two frame members, the reinforcing member, and the upright frame are connected to each other at the tip portion of the bogie frame.

3 Claims, 6 Drawing Sheets

(58) Field of Classification Search
CPC ... B60S 13/00; E04H 6/36; E04H 6/34; E04H 6/305; E04H 6/302
See application file for complete search history.

(56) References Cited

U.S. PATENT DOCUMENTS

| | | | |
|---|---|---|---|
| 2013/0251481 A1* | 9/2013 | Shani | E04H 6/36 414/231 |
| 2018/0142488 A1* | 5/2018 | Boussard | E04H 6/36 |
| 2020/0180696 A1* | 6/2020 | Tzivanopoulos | E04H 6/34 |
| 2020/0269425 A1* | 8/2020 | Shikano | B25J 3/04 |
| 2022/0073330 A1* | 3/2022 | Cord | B60P 3/077 |
| 2024/0102307 A1* | 3/2024 | Cord | E04H 6/305 |

FOREIGN PATENT DOCUMENTS

| | | | | |
|---|---|---|---|---|
| CN | 111622561 A | * | 9/2020 | |
| DE | 102018221169 A1 | * | 6/2020 | ............. B60S 13/00 |
| FR | 3036349 A1 | * | 11/2016 | ............. B60S 13/00 |
| FR | 3090541 A1 | * | 6/2020 | ............... B60P 3/07 |
| JP | 2019078099 A | * | 5/2019 | |
| JP | 6632838 B2 | * | 1/2020 | |
| KR | 20120011384 A | * | 2/2012 | |
| WO | WO-2005059276 A1 | * | 6/2005 | ............ E04H 6/183 |
| WO | WO-2016127764 A1 | * | 8/2016 | |
| WO | WO-2016189233 A1 | * | 12/2016 | ............. B60S 13/00 |
| WO | WO-2020128380 A1 | * | 6/2020 | ............... B60P 3/07 |
| WO | WO-2021117086 A1 | * | 6/2021 | |

\* cited by examiner

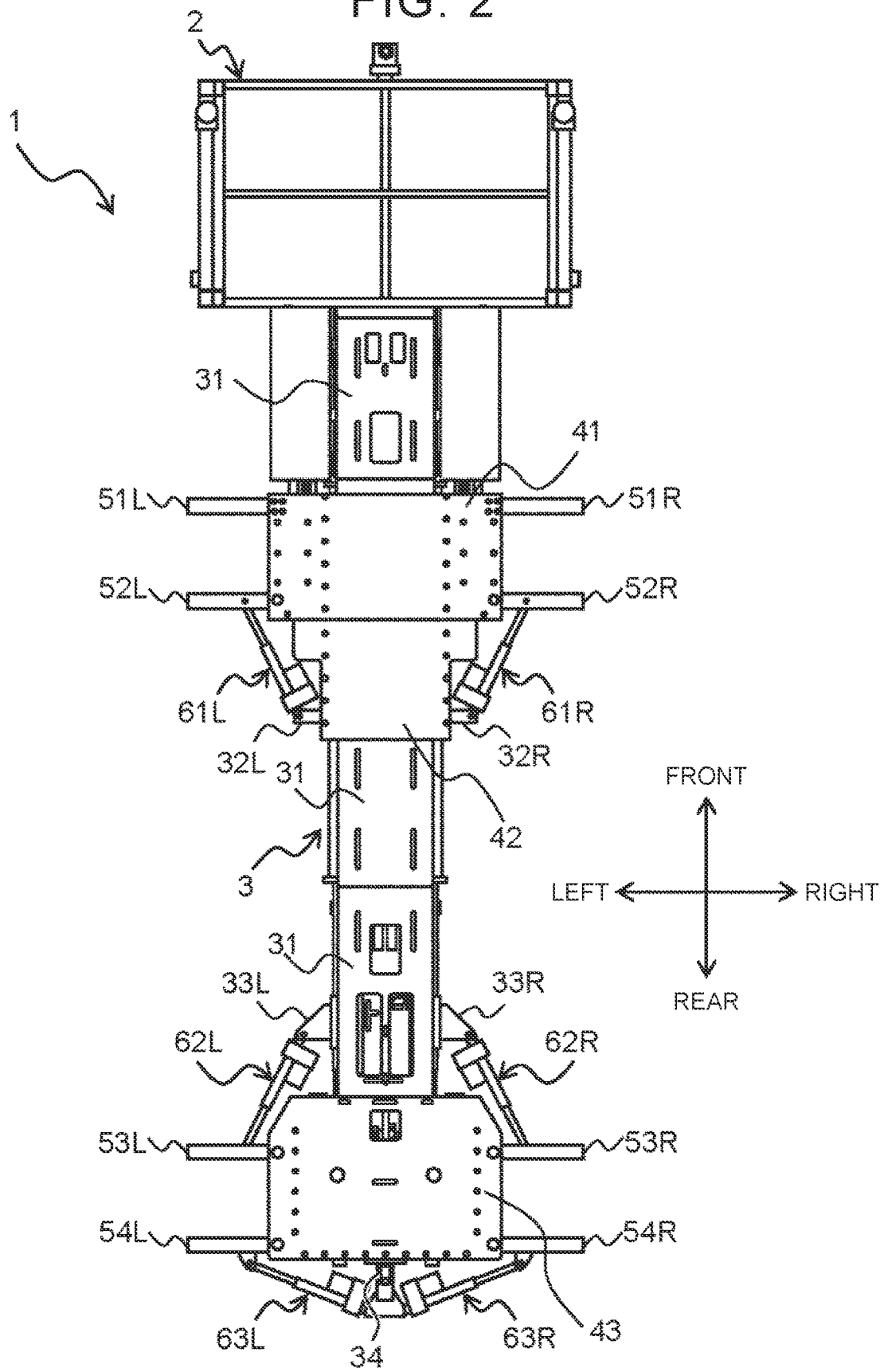

VEHICLE TRANSPORTING DEVICE

CROSS-REFERENCE TO RELATED APPLICATION

This application claims priority to Japanese Patent Application No. 2021-104308 filed on Jun. 23, 2021, incorporated herein by reference in its entirety.

BACKGROUND

1. Technical Field

The present disclosure relates to a device for transporting a four-wheeled vehicle.

2. Description of Related Art

Japanese Unexamined Patent Application Publication No. 2019-078099 (JP 2019-078099 A) discloses a device for transporting a four-wheeled vehicle. This conventional device includes a bogie body and a bogie frame towed by the bogie body. The bogie body and the bogie frame are connected at the base end portion of the bogie frame, and an upright frame is provided here. The upright frame is provided perpendicular to the plane defined by the bogie frame. The bogie body also includes a base end elevating portion that raises and lowers the base end portion. When the base end elevating portion lifts up the base end portion, the upright frame is lifted up together with the base end portion.

SUMMARY

The lift-up of the base end portion is performed by the base end elevating portion when the four-wheeled vehicle is transported. Therefore, during the lift-up of the base end portion, a bending moment caused by the load of the four-wheeled vehicle acts on the connecting portion between the base end portion and the upright frame. Therefore, the connecting portion is required to have strength that can withstand the bending moment. However, the bogie frame of the conventional device has a simple structure in which two aggregates are arranged in parallel. Therefore, further improvement is required from the viewpoint of increasing the strength of the connecting portion.

An object of the present disclosure is to provide a technique capable of increasing the strength of a connecting portion between a device main body of a device for transporting a four-wheeled vehicle and a bogie frame.

The present disclosure provides a vehicle transporting device for transporting a four-wheeled vehicle, and has the following features. The vehicle transporting device includes a bogie frame, a device main body, and an upright frame. The bogie frame is inserted into a space below a vehicle body from front or rear of the four-wheeled vehicle. The device main body raises, lowers, and tows the bogie frame. The upright frame is provided perpendicular to a plane defined by the bogie frame. The upright frame connects the bogie frame and the device main body at a tip portion of the bogie frame. The bogie frame includes at least two pipes and two frame members. The at least two pipes are disposed parallel to a longitudinal direction of the bogie frame. The two frame members are disposed parallel to the at least two pipes at a position outside the at least two pipes in a direction orthogonal to the longitudinal direction. The at least two pipes include two pipes facing each other in the orthogonal direction. The vehicle transporting device further includes a reinforcing member extending in the orthogonal direction at the tip portion and between the two pipes facing each other. The two frame members, the reinforcing member, and the upright frame are connected to each other at the tip portion.

In the present disclosure, the vehicle transporting device may further include a first additional reinforcing member and a second additional reinforcing member. The first additional reinforcing member may be provided in parallel with the reinforcing member at a position rearward of the tip portion in a front-rear direction of the bogie frame and between the two pipes facing each other. The second additional reinforcing member may be connected to the first additional reinforcing member. The second additional reinforcing member may be provided in parallel with the longitudinal direction between the two pipes facing each other.

In the present disclosure, the two pipes facing each other and the reinforcing member may be connected by welding.

In the present disclosure, the two pipes facing each other and the first additional reinforcing member may be connected by welding. The first additional reinforcing member and the second additional reinforcing member may be connected by welding.

According to the present disclosure, it is possible to increase the strength of the tip portion of the bogie frame, that is, the connecting portion between the device main body and the bogie frame. Therefore, it is possible to transport a four-wheeled vehicle having a large vehicle body weight. This contributes to the expansion of the range of four-wheeled vehicles that can be transported.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a plan view of the vehicle transporting device according to the embodiment;

DETAILED DESCRIPTION OF EMBODIMENTS

Hereinafter, a vehicle transporting device according to an embodiment of the present disclosure will be described with reference to the drawings. In each figure, the same or corresponding parts are designated by the same reference signs to simplify or omit the description.

1. Configuration Example of Vehicle Transporting Device

Figure 1:
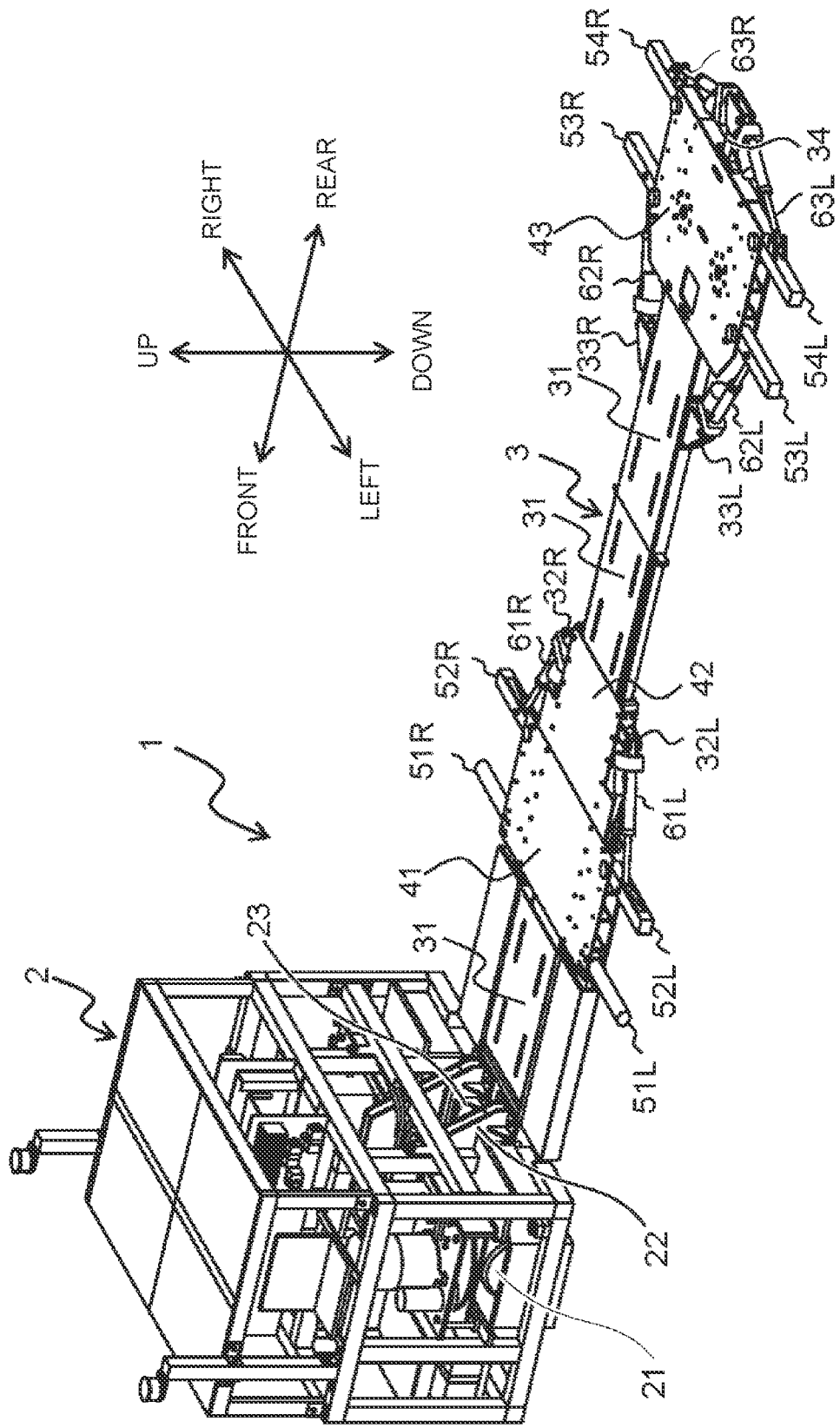
FIG. 1 is a perspective view of a vehicle transporting device according to an embodiment.

The vehicle transporting device according to the embodiment is a device for transporting a four-wheeled vehicle. A configuration example of the vehicle transporting device will be described with reference to FIGS. 1 and 2. FIG. 1 is a perspective view of the vehicle transporting device according to the embodiment, and FIG. 2 is a plan view of the vehicle transporting device according to the embodiment. As shown in FIGS. 1 and 2, a vehicle transporting device 1 includes a device main body 2, a bogie frame 3, and a total of eight arms 51L to 54L and 51R to 54R as main configurations.

The device main body 2 has a function of traveling while towing the bogie frame 3. As a configuration for this towing traveling function, the device main body 2 includes, for example, a drive device, a braking device, and a steering device. The drive device is, for example, a motor, and the motor drives bogie front wheels 21. Two bogie front wheels 21 are disposed in the width direction (right-left direction shown in FIGS. 1 and 2) of the device main body 2. The braking device applies braking force to the bogie front wheels 21. The steering device controls the turning angle of the bogie front wheels 21. The configuration for functioning as a traveling device is not particularly limited, and a known configuration is applied.

The device main body 2 also has a function of raising and lowering the bogie frame 3. As a configuration for the raising and lowering function, the device main body 2 includes, for example, an upright frame 22 and an elevating device 23. The upright frame 22 is provided at the front end of the bogie frame 3 so as to be perpendicular to the plane defined by the bogie frame 3. The device main body 2 and the bogie frame 3 are connected by the upright frame 22. The elevating device 23 is disposed in a space surrounded by the upright frame 22. The configuration of the elevating device 23 is not particularly limited. The elevating device 23 is composed of, for example, an air spring that utilizes compressed air. In another example, the elevating device 23 is configured by a hydraulic cylinder.

The bogie frame 3 has two or more pipes (for example, a square pipe) as main members. In the internal space of these pipes, electric wires for supplying electric power to various actuators provided in the bogie frame 3 and electric wires for transmitting control signals to the various actuators are provided. The bogie frame 3 also includes frame members that surround these pipes and cover members that cover the space surrounded by the frame members. In FIGS. 1 and 2, three upper surface covers 31 are illustrated as the cover members. These upper surface covers 31 are disposed side by side in the longitudinal direction (front-rear direction shown in FIGS. 1 and 2) of the bogie frame 3. In the bogie frame 3, a plurality of lower surface covers serving as cover members are disposed at positions substantially corresponding to the positions where the upper surface covers 31 are disposed.

The bogie frame 3 is provided with upper surface plates 41, 42, and 43. The upper surface plates 41 and 42 are located between the two upper surface covers 31. The upper surface plate 43 is located rearward of the bogie frame 3. The positions of the upper surface plates 41, 42, and 43 in the height direction are substantially equal to those of the upper surface covers 31. The upper surface plates 41 and 43 extend in the width direction of the bogie frame 3. The widths of the upper surface plates 41 and 43 are wider than the width of the bogie frame 3. The width of a part of the upper surface plate 42 is wider than the width of the bogie frame 3. The widths of the upper surface plates 41 and 43 are designed to be shorter than the tread width of a predetermined four-wheeled vehicle that is supposed to be transported by the vehicle transporting device 1. The upper surface plates 41 and 43 correspond to the "first and second upper surface plates".

At positions corresponding to outer peripheral regions of the upper surface plate 41 located outside the bogie frame 3, a lower surface plate to be combined with the outer peripheral regions is disposed. The arms 51L and 51R and the arms 52L and 52R are provided in the outer peripheral regions of the upper surface plate 41. The arm 51L and the arm 52L constitute a pair. The arm 51R and the arm 52R constitute a pair. The arms 51L and 51R are fixed to the upper surface plate 41. The arms 52L and 52R are each supported to be pivotable with respect to the upper surface plate 41. That is, the arms 51L and 51R correspond to "non-pivoting arms", and the arms 52L and 52R correspond to "pivoting arms". However, the arms 51L and 51R may be "pivoting arms".

The pivot of the arm 52L is performed by operating an arm driving unit 61L. The arm driving unit 61L is connected to the bogie frame 3 via a connecting member 32L on the side surface of the bogie frame 3 in the width direction (right-left direction shown in FIGS. 1 and 2) of the bogie frame 3. The connecting member 32L is attached to the side surface of the frame member whose upper surface is covered by the upper surface plate 42. The connecting member 32L supports the end portion of the arm driving unit 61L so that the arm driving unit 61L is pivotable. The configuration of the arm 52R is the same as that of the arm 52L. That is, the configuration of an arm driving unit 61R is the same as that of the arm driving unit 61L, and the configuration of a connecting member 32R is the same as that of the connecting member 32L.

Similar to the upper surface plate 41, at positions corresponding to outer peripheral regions of the upper surface plate 43 located outside the bogie frame 3, a lower surface plate to be combined with the outer peripheral regions is disposed. The arms 53L and 53R and the arms 54L and 54R are provided in the outer peripheral regions of the upper surface plate 43. The arm 53L and the arm 54L constitute a pair. The arm 53R and the arm MR constitute a pair. The arms 53L, 53R, ML, and MR are each supported to be pivotable with respect to the upper surface plate 43. That is, the arms 53L, 53R, ML, and MR correspond to "pivoting arms".

The pivot of the arm 53L is performed by operating an arm driving unit 62L. The arm driving unit 62L is connected to the bogie frame 3 via a connecting member 33L on the side surface of the bogie frame 3 in the width direction (right-left direction shown in FIGS. 1 and 2) of the bogie frame 3. The connecting member 33L is attached to the side surface of the frame member. The connecting member 33L supports the end portion of the arm driving unit 62L so that the arm driving unit 62L is pivotable. The configuration of the arm 53R is the same as that of the arm 53L. That is, the configuration of an arm driving unit 62R is the same as that of the arm driving unit 62L, and the configuration of a connecting member 33R is the same as that of the connecting member 33L.

The pivot of the arm ML is performed by operating an arm driving unit 63L. The arm driving unit 63L is connected to a support shaft 34. The support shaft 34 extends from the rear center of the bogie frame 3 in the longitudinal direction of the bogie frame 3 (the front-rear direction shown in FIGS. 1 and 2). The support shaft 34 supports the end portion of the arm driving unit 63L so that the arm driving unit 63L is pivotable. The configuration of the arm MR is the same as that of the arm ML. That is, the configuration of an arm driving unit 63R is the same as that of the arm driving unit 63L. The support shaft 34 is shared by the arm driving units 63L and 63R.

2. Operation Example when Transporting Vehicle

Figure 3A:
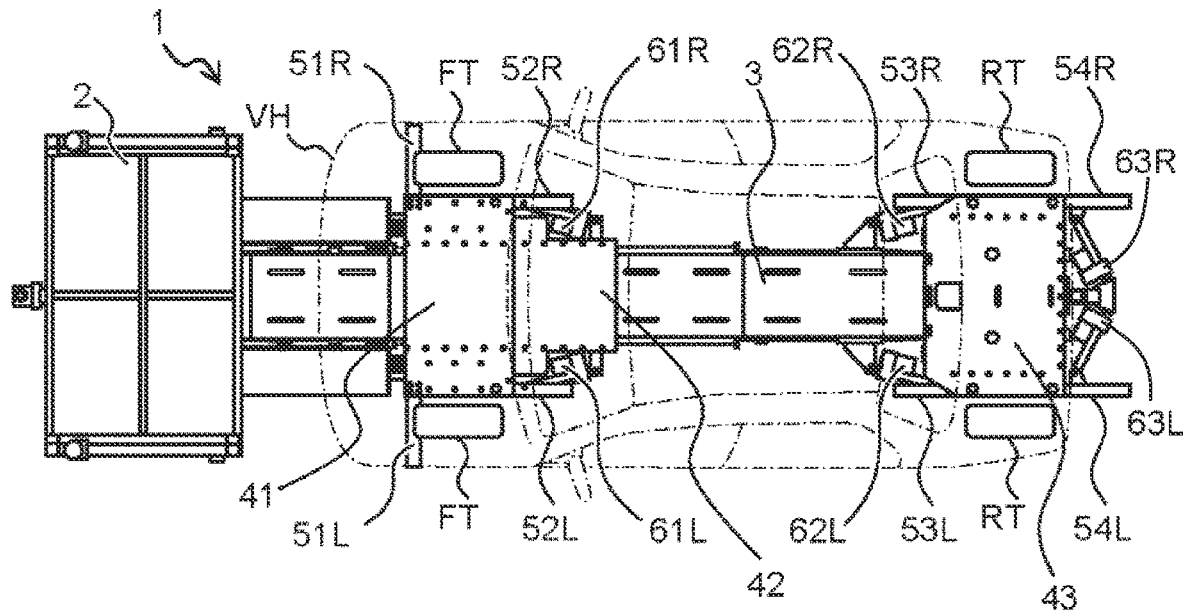
FIG. 3A is a diagram illustrating an operation example when the vehicle transporting device according to the embodiment transports a four-wheeled vehicle.
Figure 3B:
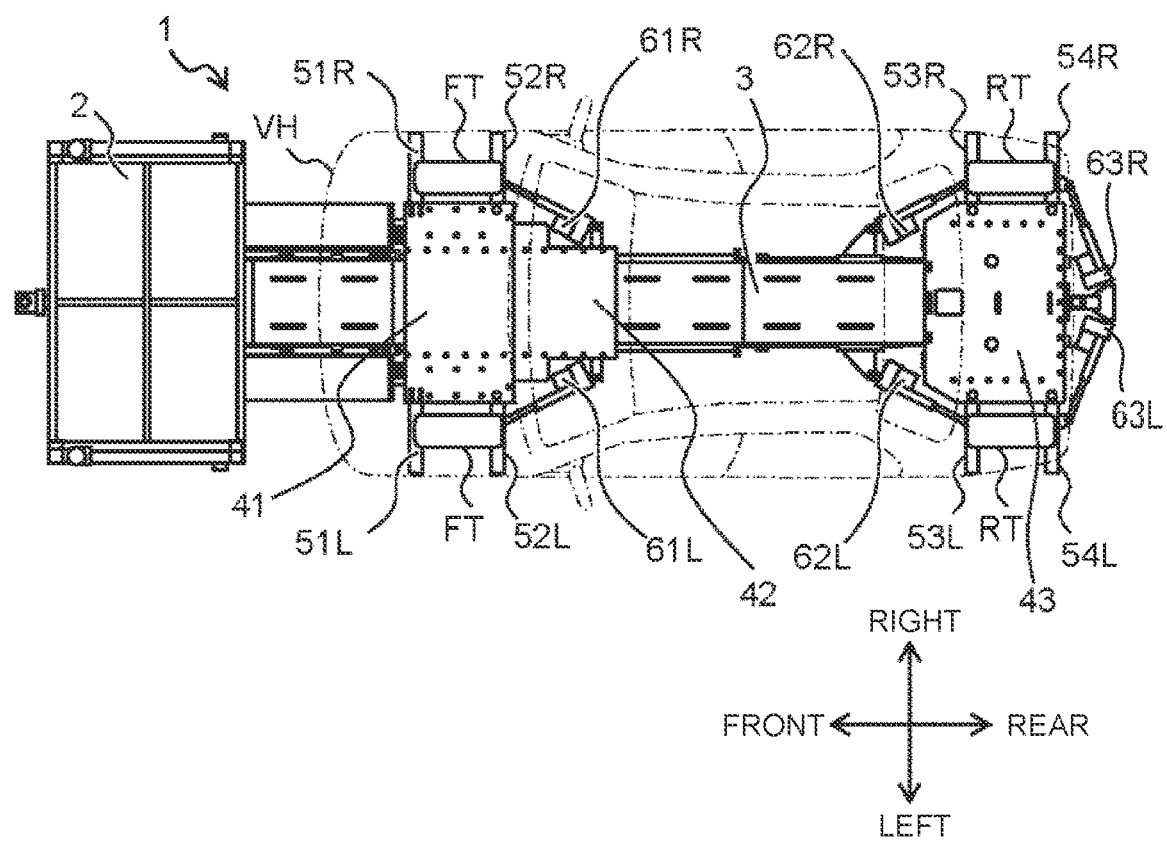
FIG. 3B is a diagram illustrating an operation example when the vehicle transporting device according to the embodiment transports a four-wheeled vehicle.

An operation example when the vehicle transporting device according to the embodiment transports a four-wheeled vehicle will be described with reference to FIGS. 3A, 3B, 4A and 4B. FIGS. 3A and 3B mainly describe the operation of the arms, and FIGS. 4A and 4B mainly describe the operation of the bogie frame. For convenience of explanation, FIGS. 3A, 3B, 4A and 4B illustrates a four-wheeled vehicle VH and its front tires FT and rear tires RT. In the examples shown in FIGS. 3A, 3B, 4A and 4B, the front tires FT are located in the front direction of the bogie frame 3, but the rear tires RT may be located at this position.

FIG. 3A is a diagram illustrating a tire release state performed by the vehicle transporting device 1. In the example shown in FIG. 3A, the bogie frame 3 is inserted into the space below the vehicle body of the four-wheeled vehicle VH. Insertion into the space below the vehicle body is performed by moving the bogie frame 3 rearward from the front of the stopped four-wheeled vehicle VH. Since the arms 51L and 51R are fixed to the upper surface plate 41, the insertion of the bogie frame 3 ends at the position where the front portion of the front tires FT abuts on the arms 51L and 51R.

During insertion into the space below the vehicle body, the six arms excluding the arms 51L and 51R are folded in the longitudinal direction (front-rear direction shown in FIG. 3A) of the bogie frame 3. Specifically, the tips of the arms 52L, 52R, 54L and 54R are folded so as to face the rear of the bogie frame 3. In addition, the tips of the arms 53L and 53R are folded so as to face the front of the bogie frame 3. By folding these six arms, the bogie frame 3 can be smoothly inserted into the space below the vehicle body.

FIG. 3B is a diagram illustrating a tire support state performed by the vehicle transporting device 1. In the example shown in FIG. 3B, the six arms excluding the arms 51L and 51R face the same direction as the extending direction (right-left direction shown in FIG. 3B) of the arms 51L and 51R. At this time, the arm 51L and the arm 52L constitute a pair and support the left front tire FT. The arm 51R and the arm 52R constitute a pair and support the right front tire FT. The arm 53L and the arm 54L constitute a pair and support the left rear tire RT. The arm 53R and the arm 54R constitute a pair and support the right rear tire RT.

Figure 4A:
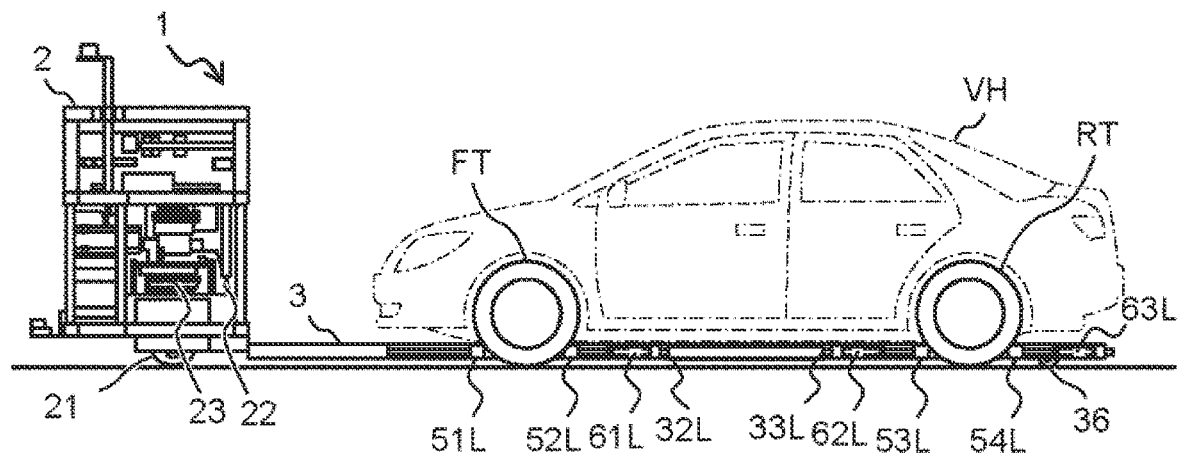
FIG. 4A is a diagram illustrating the operation example when the vehicle transporting device according to the embodiment transports the four-wheeled vehicle.

FIG. 4A is a diagram showing a lowered state of the bogie frame 3 performed by the vehicle transporting device 1. FIG. 4A corresponds to the state of the vehicle transporting device 1 after the operation described in FIG. 3B is completed. The bogie frame 3 is in the lowered state while the vehicle transporting device 1 does not transport the four-wheeled vehicle VH.

As can be seen from FIG. 4A, the arm 51L supports the front portion of the left front tire FT, and the arm 52L supports the rear portion thereof. The arm 53L supports the front portion of the left rear tire RT, and the arm 54L supports the rear portion thereof. When the longitudinal direction of the bogie frame 3 (the front-rear direction shown in FIG. 4A) is used as a reference, the arms 52L and 53L are classified into "inner arms" indicating "pivoting arms" located relatively inward. On the other hand, the arm 54L is classified into an "outer arm" indicating a "pivoting arm" located relatively outward. This classification between the "inner arm" and the "outer arm" also applies to the arms 52R to MR.

Figure 4B:
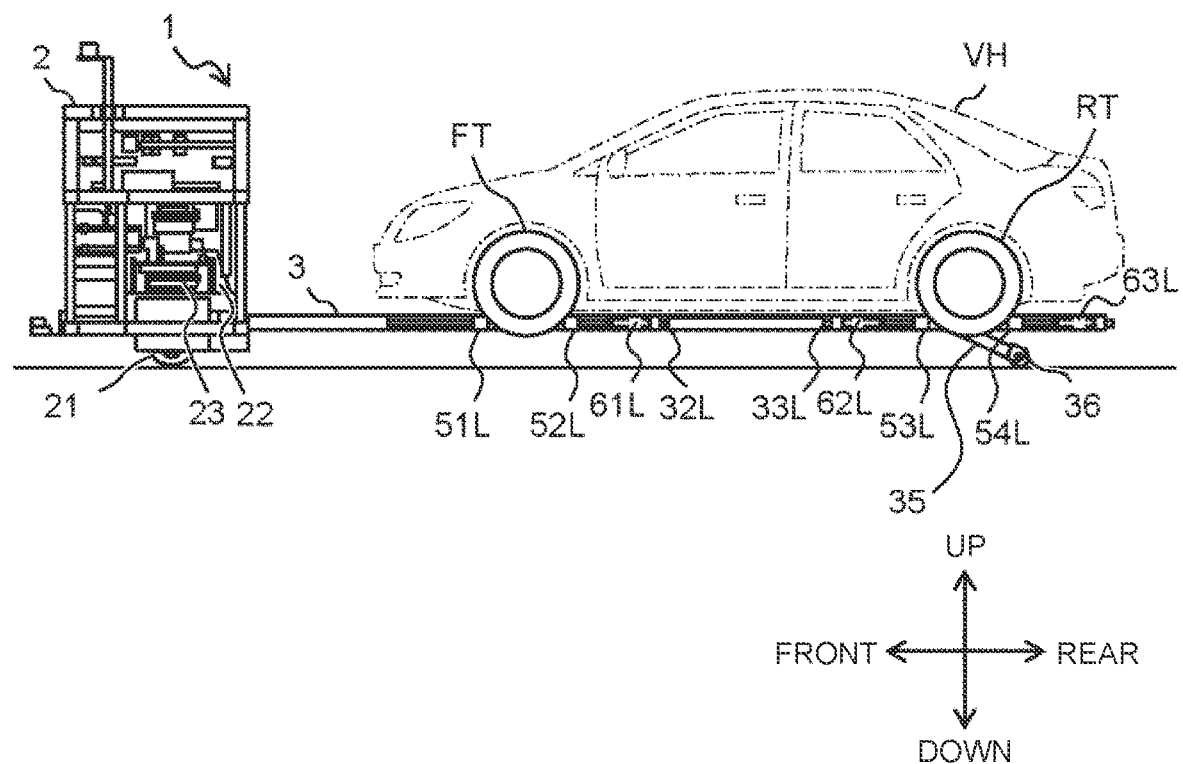
FIG. 4B is a diagram illustrating the operation example when the vehicle transporting device according to the embodiment transports the four-wheeled vehicle.

FIG. 4B is a diagram showing a raised state of the bogie frame 3 performed by the vehicle transporting device 1. FIG. 4B corresponds to a state after the state described in FIG. 4A and before the transportation of the four-wheeled vehicle VH. The raising of the bogie frame 3 is performed by a combination of the elevating device 23 and an elevating device 35 included in the bogie frame 3. The elevating device 35 is housed in the back surface of the upper surface plate 43. A known configuration such as an air spring and a hydraulic cylinder is applied to the elevating device 35. When the retracted state of the elevating device 35 is released, the bogie frame 3 is lifted while maintaining the position of a bogie rear wheel 36.

When the bogie frame 3 is raised, the four-wheeled vehicle VH is lifted. When the device main body 2 advances while maintaining this lifted state, the four-wheeled vehicle VH is transported. After the device main body 2 is stopped at a predetermined position of the transportation destination, when the elevating devices 23 and 35 are operated, the bogie frame 3 is lowered. Then, when the operation of the arms described with reference to FIG. 3A is performed, the support state of the front tires FT and the rear tires RT is released.

3. Features of Embodiment

Figure 5A:
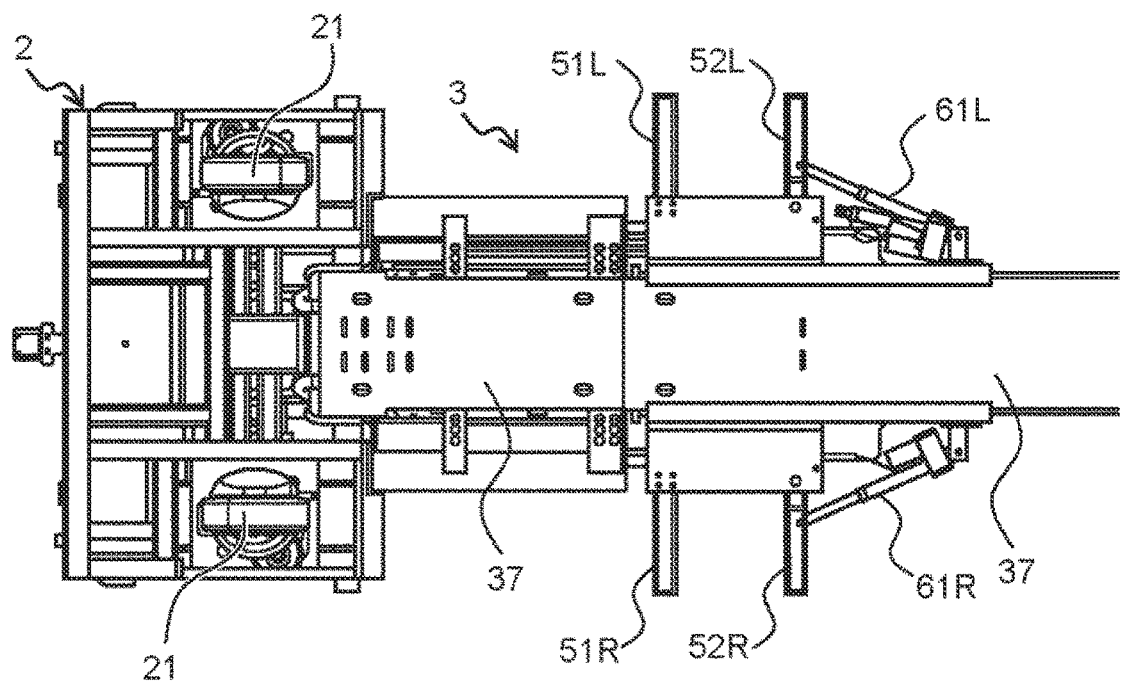
FIG. 5A is a diagram illustrating features of the vehicle transporting device according to the embodiment.
Figure 5B:
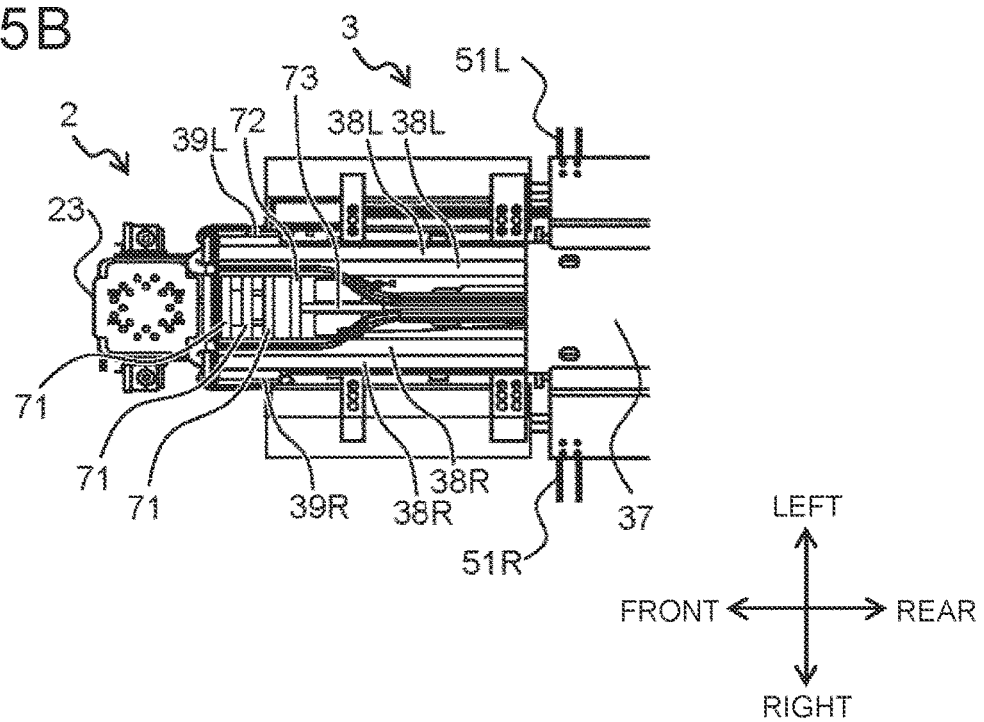
FIG. 5B is a diagram illustrating features of the vehicle transporting device according to the embodiment.

FIGS. 5A and 5B are views of the periphery of the front end portion of the bogie frame 3 as viewed from the lower surface side of the vehicle transporting device 1. FIG. 5A is an external view, and FIG. 5B is a diagram showing a main configuration related to the features of the embodiment. As shown in FIGS. 5A and 5B, two pipes 38L and two pipes 38R are provided in the longitudinal direction of the bogie frame 3. The pipes 38L and 38R are mounted on a lower surface cover 37, and various electric wires are disposed inside the pipes 38L and 38R. At the position of the front end portion of the bogie frame 3, frame members 39L and 39R are provided on both sides of the bogie frame 3 in the width direction (right-left direction shown in FIGS. 5A and 5B). The lower surface cover 37 is a cover member that covers the space surrounded by the frame member 39L and the frame member 39R.

Three reinforcing members 71 extending in the width direction of the bogie frame 3 are provided between the pipes 38L and the pipes 38R facing each other on the inside of the bogie frame 3 in the width direction. The left end of each reinforcing member 71 is welded to the pipe 38L adjacent thereto. The right end of each reinforcing member 71 is welded to the pipe 38R adjacent thereto. A reinforcing member 72 is provided in parallel with the reinforcing members 71 at a position rearward of the reinforcing members 71 in the front-rear direction of the bogie frame 3. Like the reinforcing members 71, both ends of the reinforcing member 72 are welded to the pipes 38L and 38R. A reinforcing member 73 is provided rearward of the reinforcing member 72 in the front-rear direction of the bogie frame 3. The reinforcing member 73 extends in the longitudinal direction of the bogie frame 3. One end of the reinforcing member 73 is welded to the reinforcing member 72.

Figure 6A:
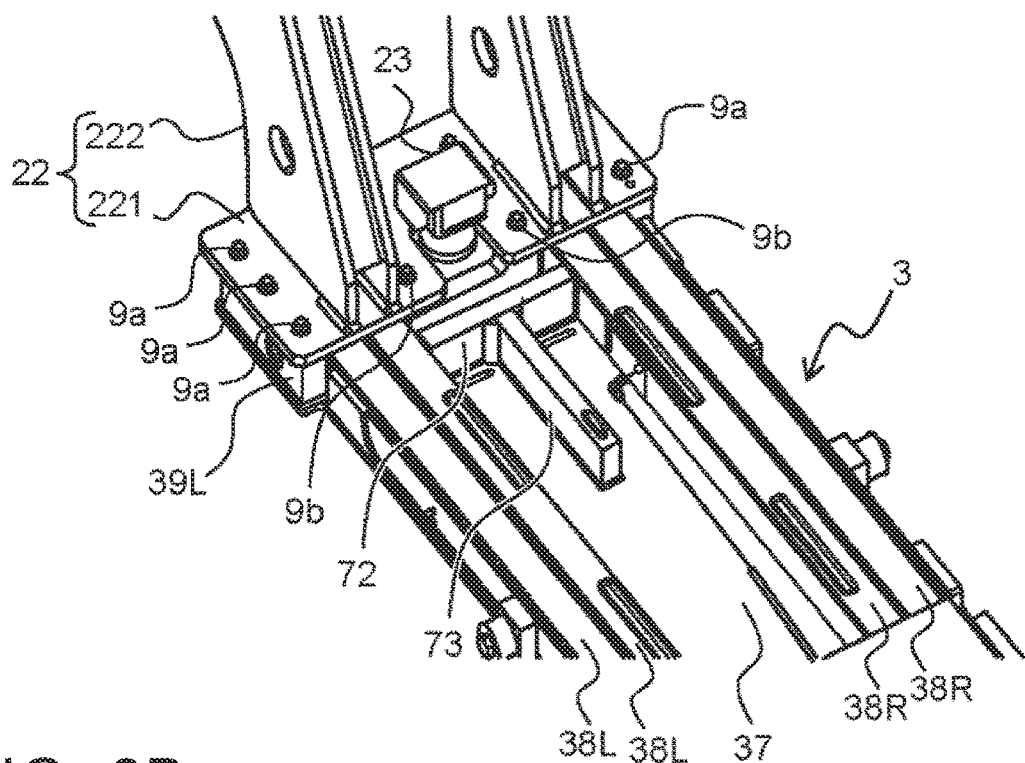
FIG. 6A is a diagram illustrating features of the vehicle transporting device according to the embodiment.
Figure 6B:
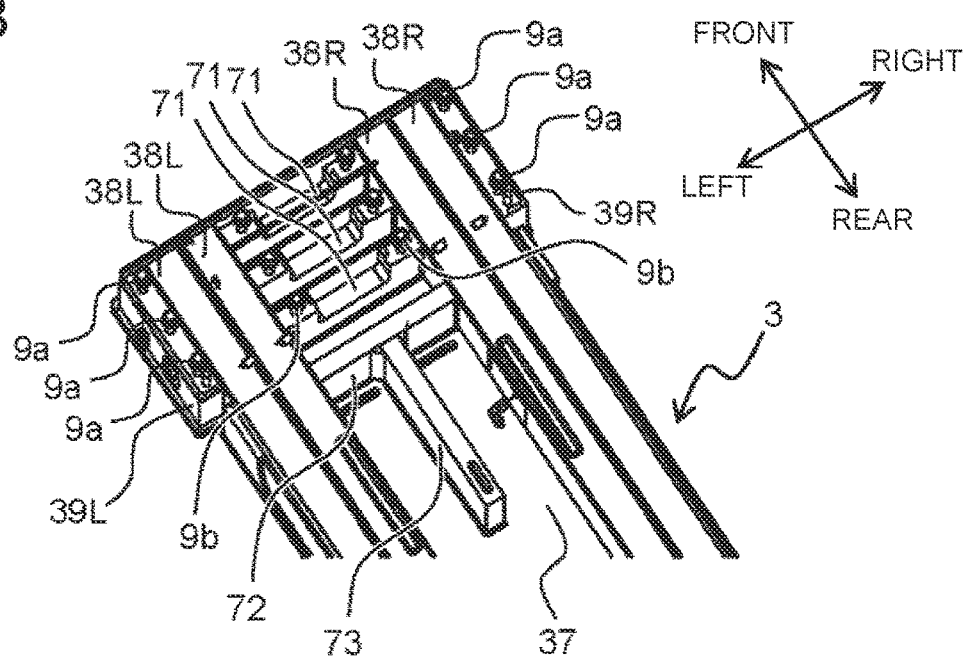
FIG. 6B is a diagram illustrating features of the vehicle transporting device according to the embodiment.

FIGS. 6A and 6B are enlarged views of a main part around the front end portion of the bogie frame 3. FIG. 6A is a perspective view showing a main configuration related to the features of the embodiment, and FIG. 6B is a diagram in which a part of the configuration shown in FIG. 6A is further excluded. As shown in FIG. 6A, the upright frame 22 is composed of a bottom surface portion 221 and an upright portion 222. The bottom surface portion 221 has a function as a cover member for covering the space surrounded by the frame members 39L and 39R. The bottom surface portion 221 also has a function as a connecting member with the bogie frame 3. The upright portion 222 has a function as a connecting member with the device main body 2.

As shown in FIG. 6B, the bottom surface portion 221 is connected to the frame members 39L and 39R via bolts 9a. The bottom surface portion 221 is also connected to the reinforcing members 71 via bolts 9b. The size of the bottom surface portion 221 in the longitudinal direction of the bogie frame 3 is substantially equal to the lengths of the frame members 39L and 39R. Therefore, the bottom surface portion 221 is not connected to the reinforcing member 72 or the reinforcing member 73. The reinforcing members 72 and 73 are T-shaped reinforcing members independent of the reinforcing members 71.

The reinforcing members 71 are provided for the purpose of countering the bending moment acting on the periphery of the front end portion of the bogie frame 3 due to the load of the four-wheeled vehicle VH when the bogie frame 3 is raised. The purpose of installing the reinforcing members 72 and 73 is basically the same as that of the reinforcing members 71. However, the reinforcing members 72 and 73 are provided in order to suppress the distribution of the rigidity of the bogie frame 3 from being significantly changed at a certain position in the longitudinal direction of the bogie frame 3 as a result of the reinforcement of the front end portion of the bogie frame 3 with the reinforcing members 71. Therefore, the reinforcing members 72 and 73 can be defined as additional reinforcing members added to the reinforcing members 71, and the installation of these additional reinforcing members can be omitted.

4. Effect

According to the features of the embodiment described above, it is possible to increase the strength of the front end portion of the bogie frame 3, that is, the connecting portion between the device main body 2 and the bogie frame 3. Therefore, it is possible to transport a four-wheeled vehicle VH having a large vehicle body weight. This contributes to the expansion of the range of four-wheeled vehicles that can be transported.

5. Other Examples of Embodiment

The arms 51L and 51R may be supported so as to be pivotable with respect to the upper surface plate 41. In this case, for the arm driving unit for driving the arms 51L and 51R, a configuration using a connecting member having the same configuration as the connecting member (connecting member 32R shown in FIGS. 1 and 2) attached to the side surface of the frame member 38 is applied.

What is claimed is:

1. A vehicle transporting device that transports a four-wheeled vehicle, the vehicle transporting device comprising:
    a bogie frame inserted into a space below a vehicle body from front or rear of the four-wheeled vehicle;
    a device main body that raises, lowers, and tows the bogie frame, the device main body includes a motor and an elevating device, the motor is configured to drive a pair of bogie front wheels to tow the bogie frame, and the elevating device includes one of an air spring or a hydraulic cylinder to raise and lower the bogie frame;
    an upright frame that is provided perpendicular to a plane defined by the bogie frame and that connects the bogie frame and the device main body at a tip portion of the bogie frame, wherein:
    the bogie frame includes at least two pipes disposed parallel to a longitudinal direction of the bogie frame and two frame members disposed parallel to the at least two pipes at a position outside the at least two pipes in a direction orthogonal to the longitudinal direction;
    the at least two pipes include two pipes spaced apart from each other in the orthogonal direction;
    the vehicle transporting device further includes a reinforcing member extending in the orthogonal direction at the tip portion and between the two pipes facing each other;
    the two frame members, the reinforcing member, and the upright frame are connected to each other at the tip portion; and
    the vehicle transporting device further comprises:
        a first additional reinforcing member provided in parallel with the reinforcing member at a position rearward of the tip portion in a front-rear direction of the bogie frame and between the two pipes facing each other; and
        a second additional reinforcing member connected to the first additional reinforcing member and provided in parallel with the longitudinal direction between the two pipes spaced apart from each other in the orthogonal direction, the second additional reinforcing member spaced apart from the two pipes spaced apart from each other in the orthogonal direction.

2. The vehicle transporting device according to claim 1, wherein the two pipes spaced apart from each other in the orthogonal direction and the reinforcing member are connected by welding.

3. The vehicle transporting device according to claim 1, wherein:
    the two pipes spaced apart from each other in the orthogonal direction and the first additional reinforcing member are connected by welding; and
    the first additional reinforcing member and the second additional reinforcing member are connected by welding.

* * * * *